United States Patent
Tang et al.

(10) Patent No.: US 10,217,487 B2
(45) Date of Patent: *Feb. 26, 2019

(54) METHOD AND DEVICE FOR CONTROLLING PLAYBACK

(71) Applicant: Xiaomi Inc., Beijing (CN)

(72) Inventors: Mingyong Tang, Beijing (CN); Huayijun Liu, Beijing (CN); Tao Chen, Beijing (CN)

(73) Assignee: Xiaomi Inc., Beijing (CN)

( * ) Notice: Subject to any disclaimer, the term of this patent is extended or adjusted under 35 U.S.C. 154(b) by 577 days.

This patent is subject to a terminal disclaimer.

(21) Appl. No.: 14/927,590

(22) Filed: Oct. 30, 2015

(65) Prior Publication Data

US 2016/0293209 A1    Oct. 6, 2016

Related U.S. Application Data

(63) Continuation of application No. PCT/CN2015/088687, filed on Aug. 31, 2015.

(30) Foreign Application Priority Data

Mar. 31, 2015    (CN) .......................... 2015 1 0149222

(51) Int. Cl.
*H04N 9/80* (2006.01)
*G11B 27/00* (2006.01)
(Continued)

(52) U.S. Cl.
CPC ........ *G11B 27/005* (2013.01); *G06K 9/00744* (2013.01); *G06K 9/52* (2013.01);
(Continued)

(58) Field of Classification Search
CPC .... G11B 27/005; G06K 9/00744; G06K 9/52; G06T 7/20
(Continued)

(56) References Cited

U.S. PATENT DOCUMENTS

2002/0039481 A1    4/2002    Jun et al.
2006/0104609 A1    5/2006    Ohmori et al.
(Continued)

FOREIGN PATENT DOCUMENTS

CN    1202699 A    12/1998
CN    1234681 A    11/1999
(Continued)

OTHER PUBLICATIONS

Choi, Lark Knwon, Cormack, Lawrence K., Bovik, Alan C. "Motion Silencing of Flicker Distortions on Naturalistic Video", Nov. 2015 39 Part B: 328-341, Elsevier B.V.*
(Continued)

*Primary Examiner* — William C Vaughn, Jr.
*Assistant Examiner* — Daniel Tekle
(74) *Attorney, Agent, or Firm* — Finnegan, Henderson, Farabow, Garrett & Dunner LLP

(57) ABSTRACT

A method for controlling playback, includes: obtaining a video file; determining whether a subject in the video file satisfies a predefined condition of variable speed playback; and in response to determining that the subject satisfies the predefined condition of variable speed playback, playing back the video file at a variable speed.

16 Claims, 9 Drawing Sheets

(51) Int. Cl.
*H04N 5/76* (2006.01)
*H04N 5/783* (2006.01)
*G06K 9/00* (2006.01)
*G06K 9/52* (2006.01)
*G06T 7/20* (2017.01)
*G06T 7/60* (2017.01)
*H04N 5/765* (2006.01)
*H04N 5/91* (2006.01)

(52) U.S. Cl.
CPC .................. *G06T 7/20* (2013.01); *G06T 7/60* (2013.01); *H04N 5/76* (2013.01); *H04N 5/765* (2013.01); *H04N 5/783* (2013.01); *H04N 5/91* (2013.01)

(58) Field of Classification Search
USPC ........................................................ 386/248
See application file for complete search history.

(56) References Cited

U.S. PATENT DOCUMENTS

| | | | | |
|---|---|---|---|---|
| 2007/0201817 | A1* | 8/2007 | Peker | G06F 17/30787 386/329 |
| 2010/0040348 | A1* | 2/2010 | Toma | G11B 27/322 386/248 |
| 2014/0099074 | A1 | 4/2014 | Kano | |

FOREIGN PATENT DOCUMENTS

| | | |
|---|---|---|
| CN | 101600107 A | 12/2009 |
| CN | 101771853 A | 7/2010 |
| CN | 101808229 A | 8/2010 |
| CN | 104270608 A | 1/2015 |
| CN | 104735385 A | 6/2015 |
| EP | 2079231 A1 | 7/2009 |
| EP | 2202748 A2 | 6/2010 |
| JP | 2003507943 A | 2/2003 |
| JP | 2003304444 A | 10/2003 |
| JP | 2004159887 A | 6/2004 |
| JP | 2006015009 A | 1/2006 |
| JP | 2008167423 A | 7/2008 |
| JP | 2012-124607 A | 6/2012 |
| JP | 2014220761 A | 11/2014 |
| JP | 2014-236379 A | 12/2014 |
| KR | 20020026099 A | 4/2002 |
| KR | 20130026982 A | 3/2013 |
| RU | 2496135 C2 | 10/2013 |

OTHER PUBLICATIONS

Extended European Search Report issued by the European Patent Office dated Jul. 8, 2017, in counterpart European Application No. 16153087.8-1902.

Notification of Reasons for Refusal issued by the Japanese Patent Office dated May 9, 2017, in counterpart Japanese Application No. 2017-508737.

Notification of Reason for Refusal issued by the Korean Patent Office dated Aug. 2, 2016, in counterpart Korean Application No. 10-2015-7031934.

Notification and Search Report issued by the Russian Patent Office dated Oct. 11, 2016, in counterpart Russian Application No. 2015150036/07.

Report on the Examination Results issued by the Russian Patent Office dated Mar. 10, 2017, in counterpart Russian Application No. 2015150036/07.

International Search Report issued by the State Intellectual Property Office of the People's Republic of China (SIPO) dated Dec. 31, 2015, in counterpart International Application No. PCT/CN2015/088687.

Notification of Reasons for Refusal issued by the Japanese Patent Office dated Jan. 9, 2018, in counterpart Japanese Application No. 2017-508737.

* cited by examiner

METHOD AND DEVICE FOR CONTROLLING PLAYBACK

CROSS-REFERENCE TO RELATED APPLICATIONS

This application is a continuation application of International Application No. PCT/CN2015/088687, filed on Aug. 31, 2015, which is based on and claims priority to Chinese Patent Application No. 201510149222.4, filed on Mar. 31, 2015, the entire contents of all of which are incorporated herein by reference.

TECHNICAL FIELD

The present disclosure relates to a field of wearable device technology and, more particularly, to a method and a device for controlling playback.

BACKGROUND

With the development of science and technology, more and more wearable devices appear, such as smart bracelets, smart glasses and the like. Hence, a problem to be solved is how to utilize hardware features of the wearable devices to facilitate people's daily life.

SUMMARY

According to a first aspect of embodiments of the present disclosure, there is provided a method for controlling playback. The method includes: obtaining a video file; determining whether a subject in the video file satisfies a predefined condition of variable speed playback; and in response to determining that the subject satisfies the predefined condition of variable speed playback, playing back the video file at a variable speed.

According to a second aspect of embodiments of the present disclosure, there is provided a device. The device includes: a processor; and a memory configured to store instructions executable by the processor. The processor is configured to obtain a video file, determine whether a subject in the video file satisfies a predefined condition of variable speed playback, and in response to determining that the subject satisfies the predefined condition of variable speed playback, play back the video file at a variable speed.

According to a third aspect of embodiments of the present disclosure, there is provided a non-transitory computer-readable storage medium having stored therein instructions that, when executed by a processor of a device, cause the device to perform a method for controlling playback. The method includes: obtaining a video file; determining whether a subject in the video file satisfies a predefined condition of variable speed playback; and in response to determining that the subject satisfies the predefined condition of variable speed playback, playing back the video file at a variable speed.

It is to be understood that both the foregoing general description and the following detailed description are exemplary and explanatory only and are not restrictive of the disclosure.

BRIEF DESCRIPTION OF THE DRAWINGS

The accompanying drawings, which are incorporated in and constitute a part of this specification, illustrate embodiments consistent with the present disclosure and, together with the description, serve to explain the principles of the present disclosure.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the disclosure. Instead, they are merely examples of apparatuses and methods consistent with aspects related to the disclosure as recited in the appended claims.

Figure 1:
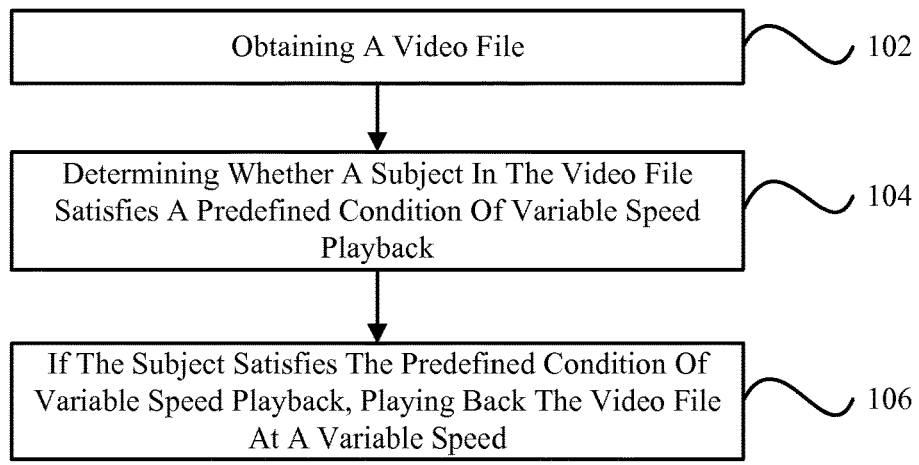
FIG. 1 is a flow chart of a method for controlling playback, according to an exemplary embodiment.

FIG. 1 is a flow chart of a method 100 for controlling playback, according to an exemplary embodiment. As shown in FIG. 1, the method 100 may be used in a wearable device. The method 100 may include the following steps.

In step 102, a video file is obtained.

In this embodiment, the wearable device may be smart glasses, and can automatically determine whether to play the video file at a variable speed, by shooting a subject along with conditional judgment, so as to optimize a viewing process of a user.

Figure 2:
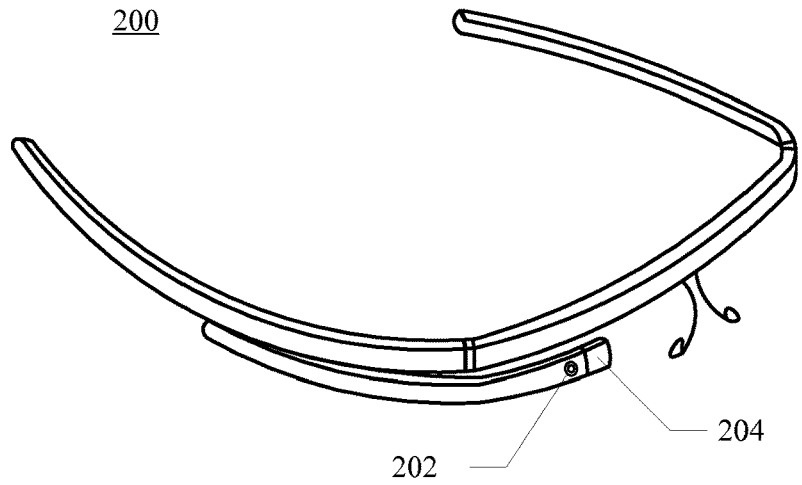
FIG. 2 is a schematic diagram of a pair of smart glasses, according to an exemplary embodiment.

In one exemplary embodiment, the subject may be shot directly by the smart glasses. FIG. 2 is a schematic diagram of a pair of smart glasses 200, according to an exemplary embodiment. Referring to FIG. 2, in the exemplary embodiment, the smart glasses 200 are equipped with a camera 202 and a displaying screen 204. The smart glasses 200 can directly invoke its own camera 202 to shoot a video of the subject, and play back the video at the variable speed on the displaying screen 204 when it is judged that the subject satisfies a condition of variable speed playback.

Figure 3:
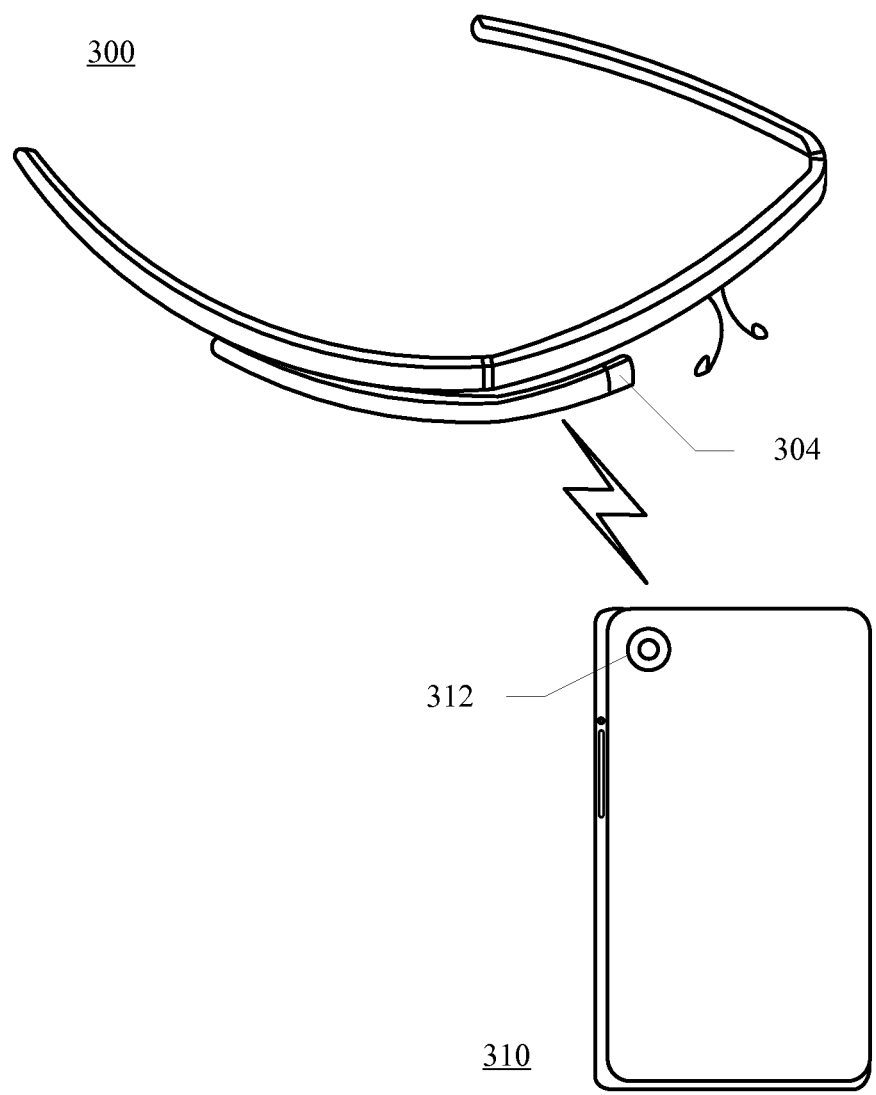
FIG. 3 is a schematic diagram of a pair of smart glasses and a smart phone, according to an exemplary embodiment.

In another exemplary embodiment, the smart glasses may cooperate with another device (such as a smart phone) for shooting a subject. FIG. 3 is a schematic diagram of a pair of smart glasses 300 and a smart phone 310, according to an exemplary embodiment. As shown in FIG. 3, in the exemplary embodiment, the smart glasses 300 are not provided with any camera, but are provided with a displaying screen 304. In such a case, a camera 312 of the smart phone 310 may shoot a video of a subject, and the smart glasses 300 can obtain the video file from the smart phone 310. As still another exemplary embodiment, the smart glasses are equipped with a camera, but another device equipped with a better camera, such as a smart phone, may shoot the video and then transmit the video file to the smart glasses to realize the variable speed playback.

The video file may be transmitted between the smart glasses and the smart phone in a wireless manner, such as Bluetooth. Of course, any wireless or wired data transmission mode may be applied to the technical solution of the present disclosure which does not limit the transmission mode.

In step 104, it is determined whether the subject in the video file satisfies a predefined condition of variable speed playback.

In exemplary embodiments, there are various ways to determine whether the predefined condition of variable speed playback is satisfied, such as determining based on a motion intensity range, a shooting scene, and the like, which will be described below in detail.

In step 106, if the predefined condition of variable speed playback is satisfied, the video file is played back at a variable speed.

In the above embodiment, in a process of shooting a video of a subject, the subject is analyzed to determine whether a condition of variable speed playback is satisfied, such that the video file can be played back at the variable speed automatically. Therefore, the user can view the subject clearly via automatic slow playback when the subject moves at a relatively fast speed, and can quickly browse the overall motion of the subject via automatic fast playback when the subject moves at a relatively slow speed. As a result, the viewing experience can be improved.

The technical solution of the present disclosure has many implementations concerning determining whether the variable speed playback condition is satisfied in step 104 and the execution of variable speed playback in step 106. In the following, each processing feature will be illustrated respectively.

The following embodiments each take "smart glasses" for example for the convenience of description, but it shall be understood by those skilled in the art that the technical solution of the present disclosure can be applied to other non-wearable devices, so long as the devices have functions of processing information and displaying images (like a displaying screen), and are capable of identifying the subject being shot and determining whether the subject satisfies the condition.

Figure 4:
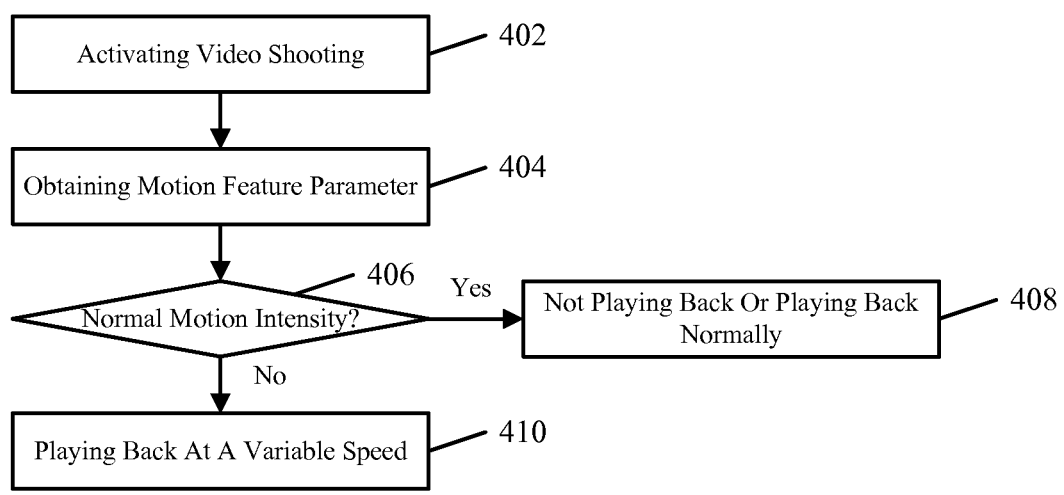
FIG. 4 is a flow chart of another method for controlling playback, according to an exemplary embodiment.

1. Judgment on the Condition of Variable Speed Playback 1.1 Based on Motion Feature Parameters FIG. 4 is a flow chart of a method 400 for controlling playback, according to an exemplary embodiment. As shown in FIG. 4, the method 400 may include the following steps.

In step 402, a video shooting function of the smart glasses is activated to execute an operation of shooting a subject.

In step 404, a motion feature parameter of the subject is obtained.

In step 406, it is determined whether a motion intensity of the subject is within a preset intensity range according to the motion feature parameter (i.e., whether the motion intensity is considered normal). If the motion intensity of the subject is within the preset intensity range, step 408 is carried out. In step 408, the video file is not played back or is played back in a normal mode without variable speed. If the motion intensity of the subject is not within the preset intensity range, step 410 is carried out. In step 410, the video file is played back at a variable speed.

In this embodiment, when the motion intensity of the subject is too high, it is possible that the user cannot clearly see the motion of the subject; and when the motion intensity of the subject is too low, it may take a long time for the user to view the entire motion process of the subject. In both cases, the user may not enjoy good viewing experience. By using the method 400, user viewing experience can be improved.

The process of determining the motion intensity of the subject according to the motion feature parameter varies according to a type of the motion feature parameter, which can be at least one of motion speed and motion frequency.

1) Motion Speed

In exemplary embodiments, two conditions, too fast and too slow, exist in terms of the motion speed, and here the condition of "too fast" is taken as an example for describing the process of determining the motion intensity of the subject. The visual persistence time (t) of human eyes generally lasts about 0.1 to 0.4 seconds. When the motion speed of the subject is too high, the motion duration of the subject in the vision field of a user may be less than t. As a result, the user may not view or identify the subject.

Therefore, in order to ensure that the motion intensity of the subject is within the preset intensity range, such that the user may identify and normally view the subject, the duration from the subject entering the vision field of the user to leaving the vision field of the user should be longer than t.

Figure 5:
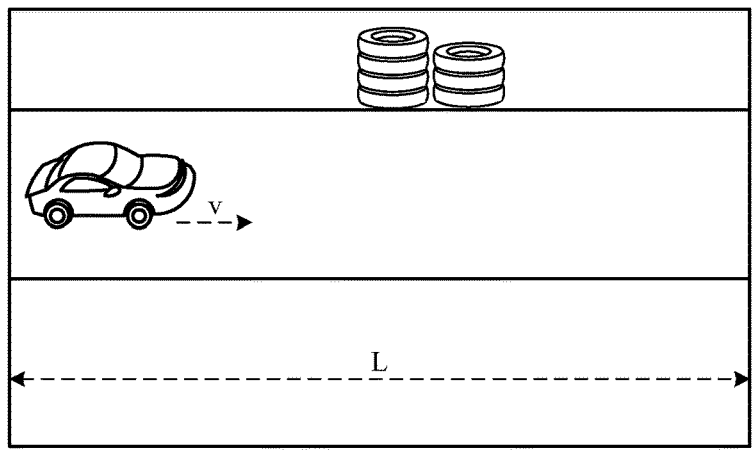
FIGS. 5-8 show schematic diagrams of video images, according to various exemplary embodiments.

In order to meet the above requirement regarding the duration, both of the actual motion speed of the subject and the shooting distance of the subject should be taken into consideration. For instance, FIG. 5 is a schematic diagram of a video image of a car racing, according to an exemplary embodiment. The video image in FIG. 5 represents a vision field of a user watching the car racing. As illustrated in FIG. 5, the actual motion speed of the car is v, and the actual length of the motion track in the vision field of the user considering the current shooting distance of the car (i.e., the distance between the camera and the car) is L. Therefore, the duration of the car passing the vision field of the user is $T=L/v$. Only if $T>t$, the user can clearly watch the motion of the car. Accordingly, in the case of the shooting distance and the vision field of the user shown in FIG. 5, an upper boundary value of the preset intensity range (equivalent to a preset speed range herein) is $L/t$. That is, the user may clearly view the motion of the car, as long as the actual motion speed v of the car is less than $L/t$; otherwise, the video file should be played back slowly.

Figure 6:
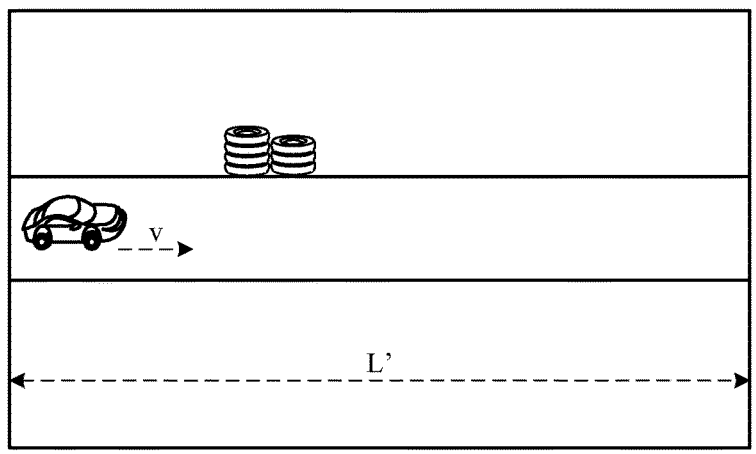

FIG. 6 is a schematic diagram of another video image of a car racing, when the shooting distance of the car increases, according to an exemplary embodiment. The video image in FIG. 6 represents a vision field of the user watching the car racing. As shown in FIG. 6, the actual length of the motion track of the car in the vision field of the user increases to L', and thus the upper boundary value of the preset intensity range increases to L'/t. That is, the user may clearly view the motion of the car, as long as the actual motion speed v of the car is less than L'/t; otherwise, the video file should be played back slowly.

2) Motion Frequency

In exemplary embodiments, two conditions, too fast and too slow, exist in terms of the motion frequency, and here the condition of "too fast" is taken as an example for describing the process of determining the motion intensity of the subject. Since the visual persistence time (t) of human eyes generally lasts about 0.1 to 0.4 seconds, if the motion frequency of the subject in the vision field of the user is greater than F=25 times per second, the user may not view or identify the subject.

Figure 7:
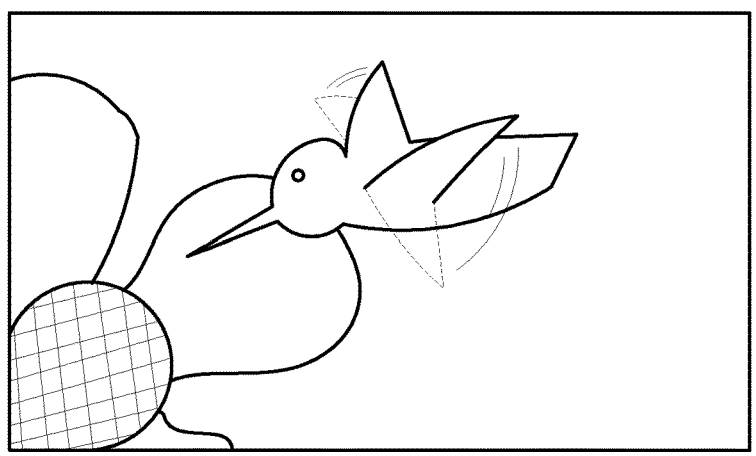

For instance, FIG. 7 is a schematic diagram of a video image of a hummingbird flying, according to an exemplary embodiment. The video image in FIG. 7 represents a vision field of a user observing the hummingbird flying. In the entire observation process, the hummingbird may remain in the vision field of the user. But the user may still not normally observe the flying process of the hummingbird because the frequency of the hummingbird flapping wings usually exceeds 50 times per second, or even reaches hundreds of times per second. It is assumed that the motion frequency of the subject (the hummingbird) flapping wings is f. When f is greater than F, it is determined that the motion intensity goes beyond a preset intensity range (equivalent to a preset frequency range herein, and F being the upper boundary value of the preset frequency range), and the video file needs to be played back slowly to optimize the user's viewing experience.

It shall be noted that the condition of "too fast" is taken as example for illustration of the motion speed and the motion frequency; similarly, the preset intensity range may have a lower boundary value. That is, when the motion speed or motion frequency is lower than the lower boundary value, it is determined that the motion intensity is too low and the video file needs to be played back fast to optimize the viewing experience. When the lower boundary value is set in terms of the motion speed, the lower boundary value is in positive correlation with the shooting distance.

Figure 8:
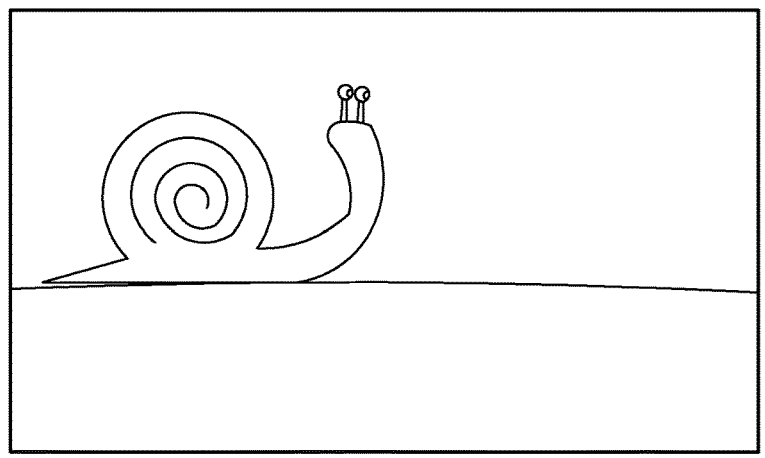

For instance, FIG. 8 is a schematic diagram of a video image of a snail crawling, according to an exemplary embodiment. The video image in FIG. 8 represents a vision field of a user viewing the snail crawling. It may take tens of minutes for the snail to pass the vision field of the user, which may be too slow for overall viewing and evaluation of the entire motion process. Consequently, the crawling process of the snail may be played back fast, such that the user finishes watching the entire crawling process in a short time for better viewing of the motion track and motion of the snail.

In the embodiment described above, the motion intensity of the subject is determined based on the motion feature parameter, and then, based on the motion intensity, it is determined whether the video file needs to be played back at the variable speed. If the value of the motion feature parameter is lower than the lower boundary value of the preset intensity range, the video file is played back fast; and if the value of the motion feature parameter is greater than the upper boundary value of the preset intensity range, the video file is played back slowly.

1.2 Based on Shooting Scenes

The smart glasses may identify a shooting scene of the video file according to a type of the subject or a type of an action performed by the subject, and may determine whether the subject in the video file satisfies the predefined condition of variable speed playback according to whether the shooting scene belongs to a preset variable speed playback scene.

In this embodiment, scenes that need to be played back at variable speeds are defined in advance as the preset variable speed playback scenes, and the identification feature of each preset variable speed playback scene is set, such as a type of the subject or a type of an action performed by the subject. Hence, the shooting scene of the video file may be determined accordingly.

For example, the car racing shooting scene shown in FIG. 5 may be determined in advance as a shooting scene which needs to be played back slowly, and a feature of a "racing car" and a "driving" action of the car are defined as identification features of the current shooting scene. If the smart glasses identify that the subject of a current shooting scene is a racing car and the car is in a driving status, the smart glasses may determine that the current shooting scene needs to be played back at the variable speed and, more specifically, the current shooting scene needs to be played back slowly.

Similarly, the snail crawling shooting scene shown in FIG. 8 may be determined in advance as a shooting scene which needs to be played back fast, and a feature of a snail is defined as the identification feature of the current shooting scene. If the smart glasses identify that the subject of a current shooting scene is a snail, the smart glasses may determine that the current shooting scene needs to be played back at the variable speed and, more specifically, the current shooting scene needs to be played back fast.

2. Variable Speed Playback

There are various forms to play back a video file at a variable speed. Several exemplary forms are described in the following, but the present disclosure is not limited thereto.

2.1 Overlapping Playback

From a video image of the video file, play data corresponding to the subject or part of the subject that satisfies the predefined condition of variable speed playback is extracted. Then the extracted play data is played in an overlapping manner when the video file is played back.

Figure 9:
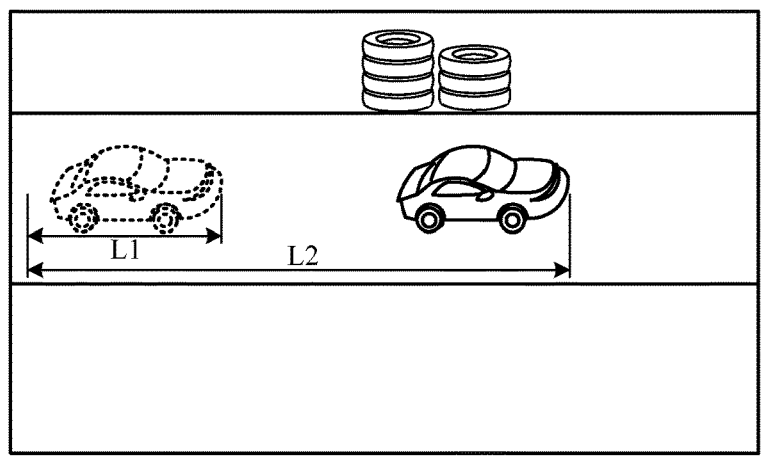
FIGS. 9-11 show schematic diagrams of videos played back at variable speeds, according to various exemplary embodiments.

FIG. 9 is a schematic diagram of a video played back at a variable speed according to an exemplary embodiment. As shown in FIG. 9, the subject of the video is a vehicle. The vehicle in dotted lines at the left side of FIG. 9 represents a picture element extracted from a video image. The picture elements extracted from all of the video images of the video constitute extracted play data. The vehicle in solid lines at the right side of FIG. 9 represents an original picture element in the video file. Hence, in the process of variable speed playback, the left vehicle in dotted lines (i.e. the extracted picture element) is superposed onto and displayed with the video image containing the right vehicle in solid lines, so as to obtain the final display image shown in FIG. 9, which can be played back on the displaying screen of the smart glasses in FIG. 2 or FIG. 3. That is, the video file containing the original picture element is played back normally (i.e., at a normal speed), and the extracted picture element is overlapped on the video file and is played back slowly (i.e., at a speed slower than the normal speed).

It may be known from FIG. 9 that due to slow playback, the driving distance of the right vehicle in solid lines is L2 while the driving distance of the left vehicle in dotted lines is only L1, such that the user may view the driving process of the vehicle more clearly.

It should be noted that, as the description of play data corresponding to part of the subject that satisfies the predefined condition of variable speed playback, since not every subject is the same as the vehicle in FIG. 9 which generates intensive motion on the whole, it is possible to determine whether each component of the subject satisfies the predefined condition of variable speed playback, and to play back, at the variable speed, only the component that satisfies the predefined condition of variable speed playback.

Figure 10:
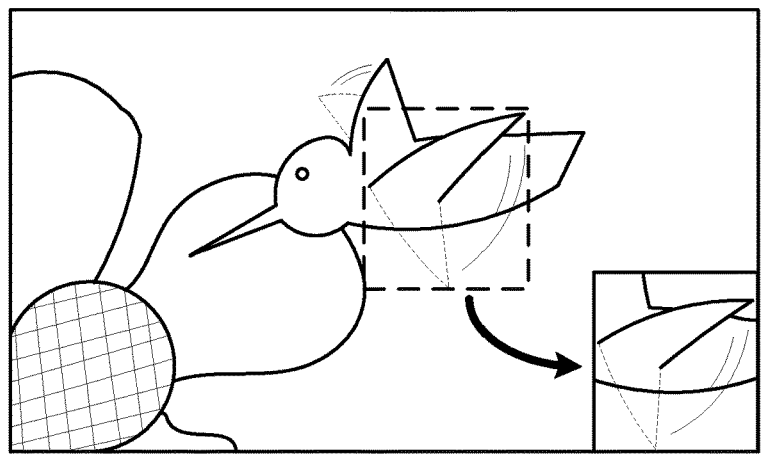

FIG. 10 is a schematic diagram of a video played back at a variable speed according to such an exemplary embodiment. As shown in FIG. 10, when a hummingbird suspends in the air, only the motion frequency of wings is greater than the preset frequency range, and thus the wing region of the hummingbird may be extracted for slow playback. Of course, if the picture element extracted is superposed onto and displayed with the original picture element, without any substantial change in the position of the subject, the wing motion played back slowly may interfere with the original wing motion, which will affect the viewing by the user. In order to solve the problem, the following playing method may be employed.

1) From a video image (e.g., a video frame) of the video file, play data corresponding to the subject or part of the subject that satisfies the predefined condition of variable speed playback is extracted. Then the extracted play data is played back slowly in an overlapping manner within a playback region at a preset position when the video file is played back normally.

For example, as shown in FIG. 10, the preset position may be the lower right corner of the vision field of the user, or any other position, and it should be ensured that the preset position will not block the original picture element. Thus, the user may watch the video file played normally and the extracted play data played back slowly at the preset position simultaneously, so as to realize comparative observation of the both.

2) From the video image of the video file, play data corresponding to the subject or part of the subject that satisfies the predefined condition of variable speed playback is extracted. An original picture element in the video image corresponding to the play data extracted is erased from the video image, so as to obtain a processed video file. The extracted play data is played back slowly in an overlapping manner when the processed video file is played back normally.

In this embodiment, the original picture element may be directly erased from the video file in order to avoid interference between the extracted picture element extracted and the original picture element, which will not degrade the user viewing experience, since the user expects to see the extracted picture element played back at the variable speed.

2.2 Completely Variable Speed Playback

Figure 11:
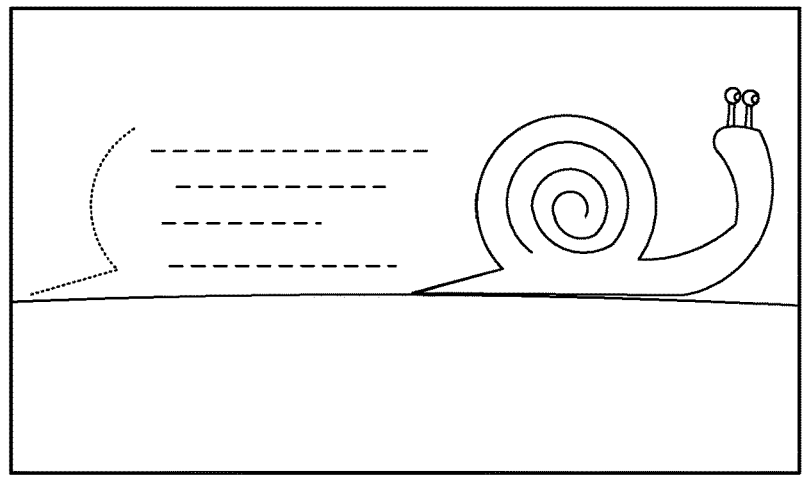

In an exemplary embodiment, a video image containing the subject may be played back completely at the variable speed. FIG. 11 is a schematic diagram of a video played back at a variable speed according to such an exemplary embodiment. As shown in FIG. 11, the video file corresponding to the snail crawling may be directly completely played back fast, which does not need any complicated processing of the video image of the video file.

The present disclosure further provides an embodiment of a device for controlling playback corresponding to the embodiment of the method for controlling playback.

Figure 12:
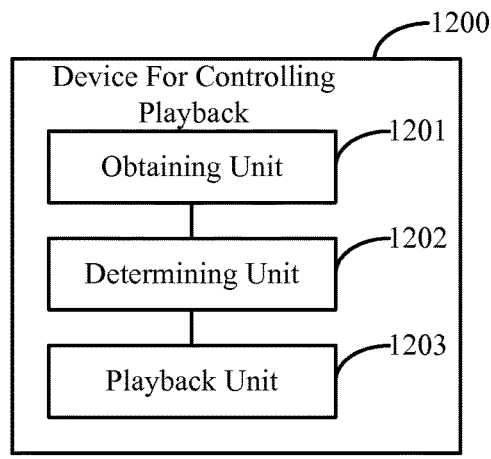
FIG. 12 is a block diagram of a device for controlling playback, according to an exemplary embodiment.

FIG. 12 is a block diagram of a device 1200 for controlling playback according to an exemplary embodiment. Referring to FIG. 12, the device 1200 includes an obtaining unit 1201, a determining unit 1202, and a playback unit 1203. The obtaining unit 1201 is configured to shoot a subject to generate a corresponding video file. The determining unit 1202 is configured to determine whether the subject in the video file satisfies a predefined condition of variable speed playback. The playback unit 1203 is configured to play back the video file at a variable speed, if the subject satisfies the predefined condition of variable speed playback.

Figure 13:
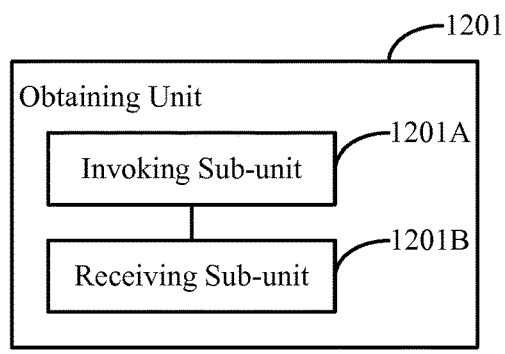
FIG. 13 is a block diagram of an obtaining unit, according to an exemplary embodiment.

FIG. 13 is a block diagram of the obtaining unit 1201 according to an exemplary embodiment. This embodiment is based on the embodiment shown in FIG. 12. The obtaining unit 1201 includes an invoking sub-unit 1201A and a receiving sub-unit 1201B. The invoking sub-unit 1201A is configured to invoke or activate a camera of the device to shoot a subject. The receiving sub-unit 1201B is configured to receive the video file obtained by shooting the subject by a camera of another device.

Figure 14:
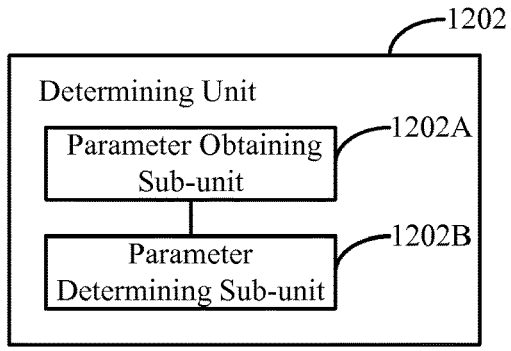
FIG. 14 is a block diagram of a determining unit, according to an exemplary embodiment.

FIG. 14 is a block diagram of the determining unit 1202 according to an exemplary embodiment. This embodiment is based on the embodiment shown in FIG. 12. The determining unit 1202 includes a parameter obtaining sub-unit 1202A and a parameter determining sub-unit 1202B. The parameter obtaining sub-unit 1202A is configured to obtain a motion feature parameter of the subject. The parameter determining sub-unit 1202B is configured to determine whether a motion intensity of the subject is within a preset intensity range, according to the motion feature parameter. If the motion intensity of the subject is within the preset intensity range, the parameter determining sub-unit 1202B is configured to determine that the subject satisfies the predefined condition of variable speed playback.

The motion feature parameter includes at least one of motion speed and motion frequency. If the motion feature parameter includes the motion speed, and the motion speed falls within a preset speed range, the motion intensity of the subject is within the preset intensity range. If the motion feature parameter includes the motion frequency, and the motion frequency falls within a preset frequency range, the motion intensity of the subject is within the preset intensity range.

A boundary value of the preset speed range is in positive correlation with a shooting distance of the subject.

It shall be noted that the structures of the parameter obtaining sub-unit 1202A and the parameter determining sub-unit 1202B shown in the embodiment of FIG. 14 may be contained in the embodiment of FIG. 13, which the present disclosure will not limit.

Figure 15:
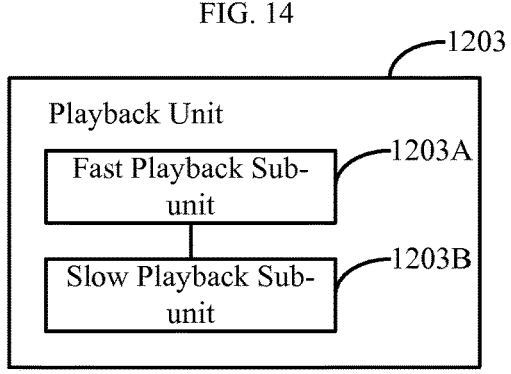
FIG. 15 is a block diagram of a playback unit, according to an exemplary embodiment.

FIG. 15 is a block diagram of the playback unit 1203 according to an exemplary embodiment. This embodiment is based on the embodiment shown in FIG. 12. The playback unit 1203 includes a fast playback sub-unit 1203A and a slow playback sub-unit 1203B. The fast playback sub-unit 1203A is configured to play back the video file fast, if a value of the motion feature parameter is smaller than a lower boundary value of the preset intensity range. The slow playback sub-unit 1203B is configured to play back the video file slowly, if the value of the motion feature parameter is greater than an upper boundary value of the preset intensity range.

Figure 16:
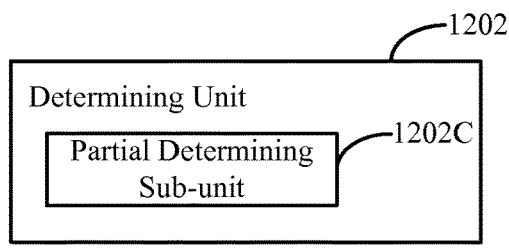
FIG. 16 is a block diagram of a determining unit, according to another exemplary embodiment.

FIG. 16 is a block diagram of the determining unit 1202 according to another exemplary embodiment. This embodiment is based on the embodiment shown in FIG. 12. The determining unit 1202 includes a partial determining sub-unit 1202C configured to determine whether each component of the subject satisfies the predefined condition of variable speed playback.

It shall be noted that the structure of the partial determining sub-unit 1202C shown in the embodiment of FIG. 16 may be contained in any one of the embodiments of FIG. 13 to FIG. 15, which the present disclosure will not limit.

Figure 17:
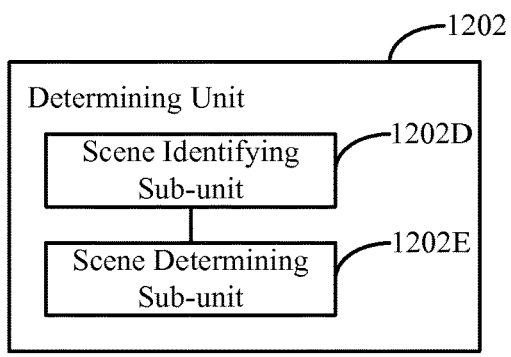
FIG. 17 is a block diagram of a determining unit, according to another exemplary embodiment.

FIG. 17 is a block diagram of the determining unit 1202 according to another exemplary embodiment. This embodiment is based on the embodiment shown in FIG. 12. The determining unit 1202 includes a scene identifying sub-unit 1202D and a scene determining sub-unit 1202E. The scene identifying sub-unit 1202D is configured to identify a shooting scene of a video file according to a type of the subject or a type of an action performed by the subject. The scene determining sub-unit 1202E is configured to determine whether the subject in the video file satisfies the predefined condition of variable speed playback, according to whether the shooting scene belongs to a preset variable speed playback scene. If the shooting scene belongs to the preset variable speed playback scene, the scene determining sub-unit 1202E is configured to determine that the subject in the video file satisfies the predefined condition of variable speed playback.

It shall be noted that the structures of the scene identifying sub-unit 1202D and the scene determining sub-unit 1202E shown in the embodiment of FIG. 17 may be contained in any one of the embodiments of FIG. 13 to FIG. 16, which the present disclosure will not limit.

Figure 18:
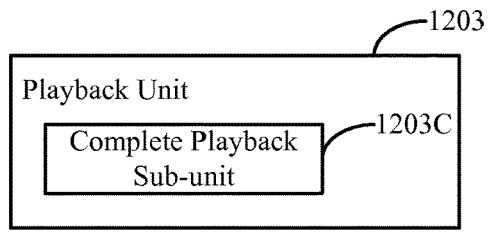
FIG. 18 that is a block diagram of a playback unit, according to another exemplary embodiment.

FIG. 18 that is a block diagram of the playback unit 1203 according to another exemplary embodiment. This embodiment is based on the embodiment shown in FIG. 12. The playback unit 1203 includes a complete playback sub-unit 1203C configured to playback a video image containing the subject completely at the variable speed.

It shall be noted that the structure of the complete playback sub-unit 1203C shown in the embodiment of FIG. 18 may be contained in any one of the embodiments of FIG. 13 to FIG. 17, which the present disclosure will not limit.

Figure 19:
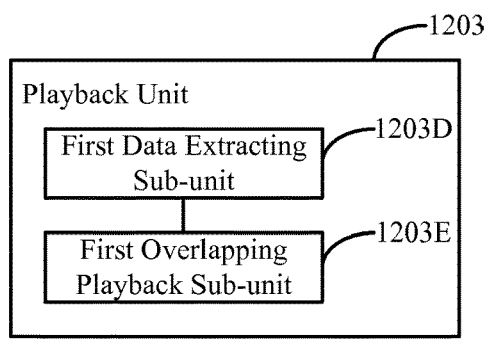
FIG. 19 is a block diagram of a playback unit, according to another exemplary embodiment.

FIG. 19 is a block diagram of the playback unit 1203 according to another exemplary embodiment. This embodiment is based on the embodiment shown in FIG. 12. The playback unit 1203 includes a first data extracting sub-unit 1203D and a first overlapping playback sub-unit 1203E. The first data extracting sub-unit 1203D is configured to extract, from a video image of the video file, play data corresponding to the subject or part of the subject that satisfies the predefined condition of variable speed playback. The first overlapping playback sub-unit 1203E is configured to play back the extracted play data in an overlapping manner when playing back the video file.

It shall be noted that the structures of the first data extracting sub-unit 1203D and the first overlapping playback sub-unit 1203E shown in the embodiment of FIG. 19 may be contained in any one of the embodiments of FIG. 13 to FIG. 18, which the present disclosure will not limit.

Figure 20:
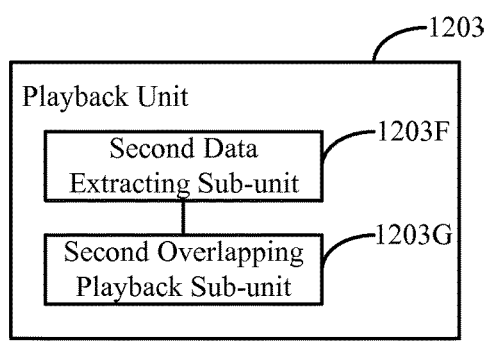
FIG. 20 is a block diagram of a playback unit according to another exemplary embodiment.

FIG. 20 is a block diagram of the playback unit 1203 according to another exemplary embodiment. This embodiment is based on the embodiment shown in FIG. 12. The playback unit 1203 includes a second data extracting sub-unit 1203F and a second overlapping playback sub-unit 1203G. The second data extracting sub-unit 1203F is configured to extract, from a video image of the video file, play data corresponding to the subject or part of the subject that satisfies the predefined condition of variable speed playback. The second overlapping playback sub-unit 1203G is configured to play back the extracted play data in an overlapping manner within a playback region at a preset position when playing back the video file.

It shall be noted that the structures of the second data extracting sub-unit 1203F and the second overlapping playback sub-unit 1203G shown in the embodiment of FIG. 20 may be contained in any one of the embodiments of FIG. 13 to FIG. 19, which the present disclosure will not limit.

Figure 21:
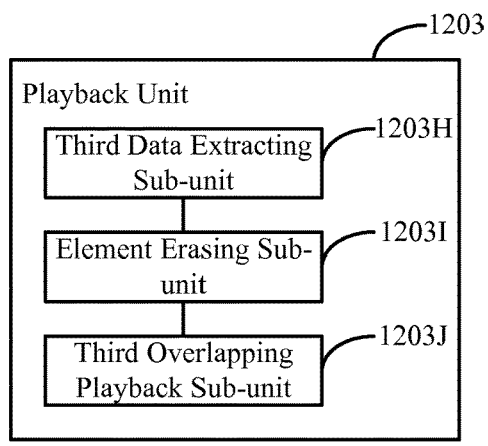
FIG. 21 is a block diagram of a playback unit, according to another exemplary embodiment.

FIG. 21 is a block diagram of the playback unit 1203 according to another exemplary embodiment. This embodiment is based on the embodiment shown in FIG. 12. The playback unit 1203 includes a third data extracting sub-unit 1203H, an element erasing sub-unit 1203I, and a third overlapping playback sub-unit 1203J. The third data extracting sub-unit 1203H is configured to extract, from a video image of the video file, play data corresponding to the subject or part of the subject that satisfies the predefined condition of variable speed playback. The element erasing sub-unit 1203I is configured to erase, from the video image, an original picture element in the video image corresponding to the extracted play data, so as to obtain a processed video file. The third overlapping playback sub-unit 1203J is configured to play back the extracted play data in an overlapping manner when playing back the processed video file.

It shall be noted that the structures of the third data extracting sub-unit 1203H, the element erasing sub-unit 1203I and the third overlapping playback sub-unit 1203J shown in the embodiment of FIG. 21 may be contained in any one of the embodiments of FIG. 13 to FIG. 20, which the present disclosure will not limit.

With respect to the devices in the above embodiments, the specific manners for performing operations for individual units therein have been described in detail in the embodiments regarding the methods for controlling playing, which will not be elaborated herein.

The device embodiments substantially correspond to the method embodiments. Therefore, relevant description of the device embodiments may also be found by referring to the method embodiments. The device embodiments described above are only exemplary, in which the units described as separate components may be or may not be physically separate. The components described as the units may be or not be a physical unit, i.e. may be located at the same location or may be distributed at many network elements. It is possible to select part of or all of the units to realize the objective of the present disclosure, which may be understood and implemented by those skilled in the art without paying more creative effort.

Accordingly, the present disclosure further provides a device for controlling playback. The device includes a processor and a memory configured to store instructions executable by the processor. The processor is configured to shoot a subject and generate a corresponding video file; and to determine whether the subject in the video file satisfies a predefined condition of variable speed playback. If the subject in the video file satisfies a predefined condition of variable speed playback, the processor is configured to play back the video file at a variable speed.

Figure 22:
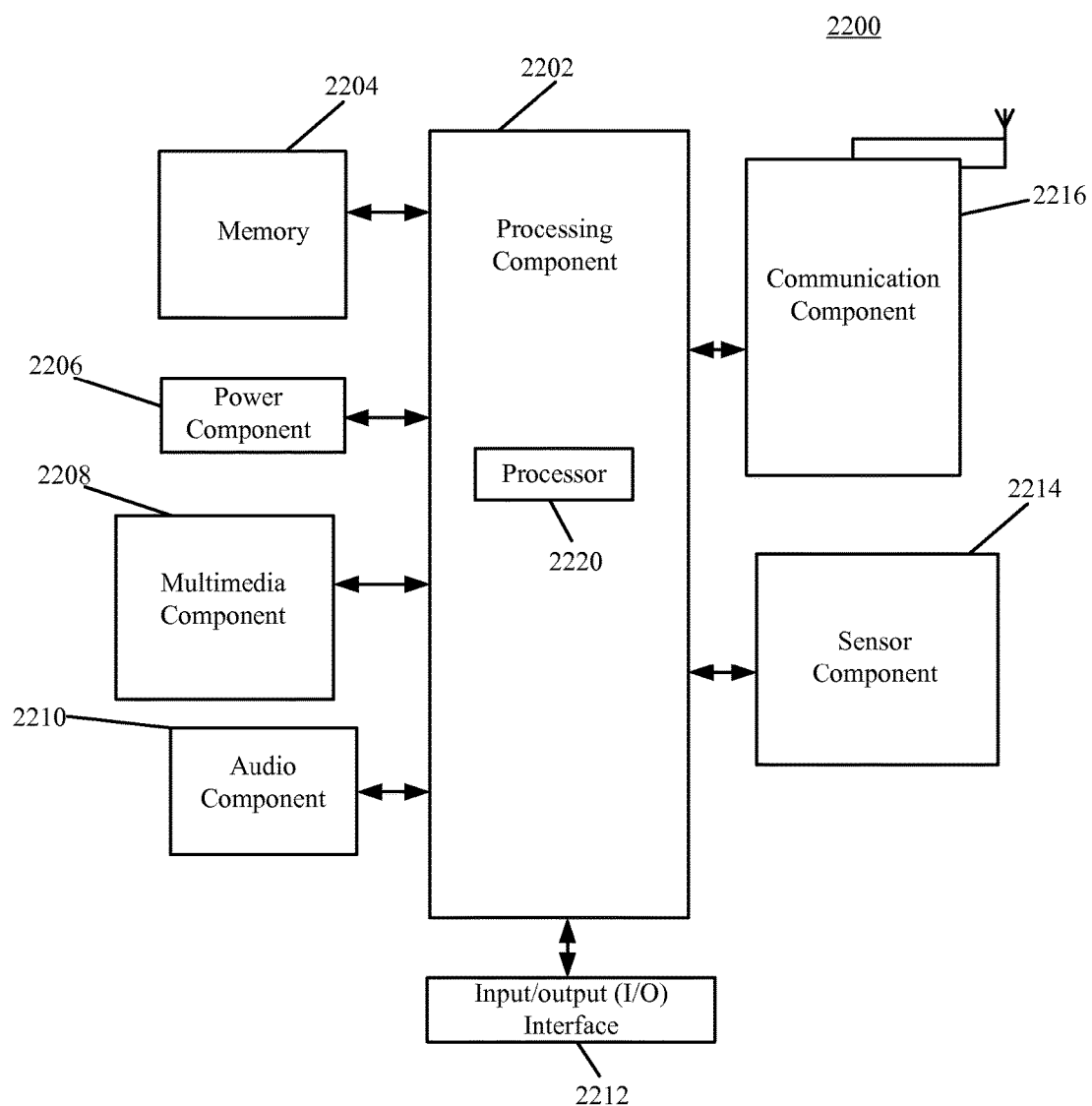
FIG. 22 is a schematic diagram of a device for controlling playback, according to an exemplary embodiment.

FIG. 22 is a block diagram of a device 2200 for controlling playback according to an exemplary embodiment. For example, the device 2200 may be a mobile phone, a computer, a digital broadcast terminal, a messaging device, a gaming console, a tablet, a medical device, exercise equipment, a personal digital assistant, a wearable device (like smart glasses) and the like.

Referring to FIG. 22, the device 2200 may include one or more of the following components: a processing component 2202, a memory 2204, a power component 2206, a multimedia component 2208, an audio component 2210, an input/output (I/O) interface 2212, a sensor component 2214, and a communication component 2216.

The processing component 2202 typically controls overall operations of the device 2200, such as the operations associated with display, telephone calls, data communications, camera operations, and recording operations. The processing component 2202 may include one or more processors 2220 to execute instructions to perform all or part of the steps in the above described methods. Moreover, the processing component 2202 may include one or more modules which facilitate the interaction between the processing component 2202 and other components. For instance, the processing component 2202 may include a multimedia module to facilitate the interaction between the multimedia component 2208 and the processing component 2202.

The memory 2204 is configured to store various types of data to support the operation of the device 2200. Examples of such data include instructions for any applications or methods operated on the device 2200, contact data, phonebook data, messages, pictures, video, etc. The memory 2204 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 2206 provides power to various components of the device 2200. The power component 2206 may include a power management system, one or more power sources, and any other components associated with the generation, management, and distribution of power in the device 2200.

The multimedia component 2208 includes a screen providing an output interface between the device 2200 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 2208 includes a front camera and/or a rear camera. The front camera and the rear camera may receive an external multimedia datum while the device 2200 is in an operation mode, such as a photographing mode or a video mode. Each of the front camera and the rear camera may be a fixed optical lens system or have focus and optical zoom capability.

The audio component 2210 is configured to output and/or input audio signals. For example, the audio component 2210 includes a microphone ("MIC") configured to receive an external audio signal when the device 2200 is in an operation mode, such as a call mode, a recording mode, and a voice recognition mode. The received audio signal may be further stored in the memory 2204 or transmitted via the communication component 2216. In some embodiments, the audio component 2210 further includes a speaker to output audio signals.

The I/O interface 2212 provides an interface between the processing component 2202 and peripheral interface modules, such as a keyboard, a click wheel, buttons, and the like. The buttons may include, but are not limited to, a home button, a volume button, a starting button, and a locking button.

The sensor component 2214 includes one or more sensors to provide status assessments of various aspects of the device 2200. For instance, the sensor component 2214 may detect an open/closed status of the device 2200, relative positioning of components, e.g., the display and the keypad, of the device 2200, a change in position of the device 2200 or a component of the device 2200, a presence or absence of user contact with the device 2200, an orientation or an acceleration/deceleration of the device 2200, and a change in temperature of the device 2200. The sensor component 2214 may include a proximity sensor configured to detect the presence of nearby objects without any physical contact. The sensor component 2214 may also include a light sensor, such as a CMOS or CCD image sensor, for use in imaging applications. In some embodiments, the sensor component 2214 may also include an accelerometer sensor, a gyroscope sensor, a magnetic sensor, a pressure sensor, or a temperature sensor.

The communication component 2216 is configured to facilitate communication, wired or wirelessly, between the device 2200 and other devices. The device 2200 can access a wireless network based on a communication standard, such as WiFi, 2G, or 3G, or a combination thereof. In one exemplary embodiment, the communication component 2216 receives a broadcast signal or broadcast associated information from an external broadcast management system via a broadcast channel. In one exemplary embodiment, the communication component 2216 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In exemplary embodiments, the device 2200 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In exemplary embodiments, there is also provided a non-transitory computer-readable storage medium including instructions, such as included in the memory 2204, executable by the processor 2220 in the device 2200, for performing the above-described methods. For example, the non-transitory computer-readable storage medium may be a ROM, a RAM, a CD-ROM, a magnetic tape, a floppy disc, an optical data storage device, and the like.

Other embodiments of the present disclosure will be apparent to those skilled in the art from consideration of the specification and practice of the disclosure disclosed here. This application is intended to cover any variations, uses, or adaptations of the disclosure following the general principles thereof and including such departures from the present disclosure as come within known or customary practice in the art. It is intended that the specification and examples be considered as exemplary only, with a true scope and spirit of the present disclosure being indicated by the following claims.

It will be appreciated that the present disclosure is not limited to the exact construction that has been described above and illustrated in the accompanying drawings, and that various modifications and changes can be made without departing from the scope thereof. It is intended that the scope of the disclosure only be limited by the appended claims.

What is claimed is:

1. A method for controlling playback, comprising:
obtaining a video file;
determining whether a subject in the video file satisfies a predefined condition of variable speed playback; and
in response to determining that the subject satisfies the predefined condition of variable speed playback, playing back the video file at a variable speed,
wherein determining whether the subject in the video file satisfies the predefined condition of variable speed playback comprises:
   obtaining a motion feature parameter of the subject;
   determining whether a motion intensity of the subject is within a preset intensity range according to the motion feature parameter; and
   in response to determining that the motion intensity of the subject is within the preset intensity range, determining that the subject satisfies the predefined condition of variable speed playback, and
wherein playing back the video file at the variable speed comprises:
   playing the video file fast in response to determining that the motion intensity of the subject is smaller than a lower boundary value of the preset intensity range; and
   playing the video file slowly in response to determining that the motion intensity of the subject is greater than an upper boundary value of the preset intensity range.

2. The method according to claim 1, wherein obtaining the video file comprises at least one of:
invoking a camera of a device to shoot the subject; or
receiving the video file obtained by shooting the subject by a camera of another device.

3. The method according to claim 1, wherein the motion feature parameter comprises at least one of a motion speed and a motion frequency, and
wherein determining whether the motion intensity of the subject is within the preset intensity range comprises:
   when the motion feature parameter includes the motion speed, and the motion speed falls within a preset speed range, determining that the motion intensity of the subject is within the preset intensity range, and
   when the motion feature parameter includes the motion frequency, and the motion frequency falls within a preset frequency range, determining that the motion intensity of the subject is within the preset intensity range.

4. The method according to claim 3, wherein a boundary value of the preset speed range is in positive correlation with a shooting distance of the subject.

5. The method according to claim 1, wherein determining whether the subject in the video file satisfies the predefined condition of variable speed playback comprises:
determining whether each component of the subject satisfies the predefined condition of variable speed playback.

6. The method according to claim 1, wherein determining whether the subject in the video file satisfies the predefined condition of variable speed playback comprises:
identifying a shooting scene of the video file according to a type of the subject or a type of an action performed by the subject;
determining whether the subject in the video file satisfies the predefined condition of variable speed playback according to whether the shooting scene is a preset variable speed playback scene; and
in response to determining that the shooting scene is the preset variable speed playback scene, determining that the subject in the video file satisfies the predefined condition of variable speed playback.

7. The method according to claim 1, wherein playing back the video file at the variable speed comprises:
playing back a video image containing the subject completely at the variable speed.

8. The method according to claim 1, wherein playing back the video file at the variable speed comprises:
extracting, from a video image of the video file, play data corresponding to the subject or part of the subject that satisfies the predefined condition of variable speed playback; and
playing back the extracted play data in an overlapping manner when playing back the video file.

9. The method according to claim 1, wherein playing back the video file at the variable speed comprises:
extracting, from a video image of the video file, play data corresponding to the subject or part of the subject that satisfies the predefined condition of variable speed playback; and
playing back the extracted play data extracted in an overlapping manner within a playback region at a preset position when playing back the video file.

10. The method according to claim 1, wherein playing back the video file at the variable speed comprises:
extracting, from a video image of the video file, play data corresponding to the subject or part of the subject that satisfies the predefined condition of variable speed playback;
erasing, from the video image, an original picture element in the video image corresponding to the extracted play data, to generate a processed video file;
playing the play data extracted in an overlapping manner when playing back the processed video file.

11. A device, comprising:
a processor;
a memory configured to store instructions executable by the processor;
wherein the processor is configured to:
   obtain a video file;
   determine whether a subject in the video file satisfies a predefined condition of variable speed playback; and
   in response to determining that the subject satisfies the predefined condition of variable speed playback, play back the video file at a variable speed,
wherein the processor is further configured to determine whether the subject in the video file satisfies the predefined condition of variable speed playback by:
   obtaining a motion feature parameter of the subject;
   determining whether a motion intensity of the subject is within a preset intensity range according to the motion feature parameter; and
   in response to determining that the motion intensity of the subject is within the preset intensity range, determining that the subject satisfies the predefined condition of variable speed playback, and
wherein the processor is further configured to play back the video file at the variable speed by:

playing the video file fast in response to determining that the motion intensity of the subject is smaller than a lower boundary value of the preset intensity range; and playing the video file slowly in response to determining that the motion intensity of the subject is greater than an upper boundary value of the preset intensity range.

12. The device according to claim 11, wherein the processor is further configured to obtain the video file by at least one of:

invoking a camera of the device to shoot the subject; or receiving the video file obtained by shooting the subject by a camera of another device.

13. The device according to claim 11, wherein the motion feature parameter includes at least one of motion speed and motion frequency, when the motion feature parameter includes the motion speed, and the motion speed falls into a preset speed range, the processor is further configured to determine that the motion intensity of the subject is within the preset intensity range, and when the motion feature parameter includes the motion frequency, and the motion frequency falls into a preset frequency range, the processor is further configured to determine that the motion intensity of the subject belongs to the preset intensity range.

14. The device according to claim 13, wherein a boundary value of the preset speed range is in positive correlation with a shooting distance of the subject.

15. The device according to claim 11, wherein the processor is further configured to determine whether the subject in the video file satisfies a predefined condition of variable speed playback by:

determining whether each component of the subject satisfies the predefined condition of variable speed playback.

16. A non-transitory computer-readable storage medium having stored therein instructions that, when executed by a processor of a device, cause the device to perform a method for controlling playback, the method comprising:

obtaining a video file;

determining whether a subject in the video file satisfies a predefined condition of variable speed playback; and in response to determining that the subject satisfies the predefined condition of variable speed playback, playing back the video file at a variable speed, wherein determining whether the subject in the video file satisfies the predefined condition of variable speed playback comprises:

obtaining a motion feature parameter of the subject;

determining whether a motion intensity of the subject is within a preset intensity range according to the motion feature parameter; and in response to determining that the motion intensity of the subject is within the preset intensity range, determining that the subject satisfies the predefined condition of variable speed playback, and wherein playing back the video file at the variable speed comprises:

playing the video file fast in response to determining that the motion intensity of the subject is smaller than a lower boundary value of the preset intensity range; and playing the video file slowly in response to determining that the motion intensity of the subject is greater than an upper boundary value of the preset intensity range.

* * * * *